United States Patent
Li et al.

(10) Patent No.: US 12,130,259 B2
(45) Date of Patent: Oct. 29, 2024

(54) NON-BASELINE ON-LINE STRESS MONITORING SYSTEM AND MONITORING METHOD BASED ON MULTI-MODE LAMB WAVE DATA FUSION

(71) Applicant: Harbin Institute of Technology, Harbin (CN)

(72) Inventors: Jiaxin Li, Harbin (CN); Jiubin Tan, Harbin (CN); Bo Zhao, Harbin (CN); Weijia Shi, Harbin (CN)

(73) Assignee: Harbin Institute of Technology, Harbin (CN)

( * ) Notice: Subject to any disclaimer, the term of this patent is extended or adjusted under 35 U.S.C. 154(b) by 363 days.

(21) Appl. No.: 17/704,081

(22) Filed: Mar. 25, 2022

(65) Prior Publication Data

US 2023/0228718 A1    Jul. 20, 2023

(30) Foreign Application Priority Data

Jan. 19, 2022    (CN) .......................... 202210061554.7

(51) Int. Cl.
| | |
|---|---|
| *G01N 29/07* | (2006.01) |
| *G01N 29/34* | (2006.01) |
| *G01N 29/36* | (2006.01) |
| *G01N 29/46* | (2006.01) |

(52) U.S. Cl.
CPC ............. *G01N 29/07* (2013.01); *G01N 29/34* (2013.01); *G01N 29/36* (2013.01); *G01N 29/46* (2013.01); *G01N 2291/0427* (2013.01)

(58) Field of Classification Search
CPC ........ G01N 29/07; G01N 29/34; G01N 29/36; G01N 29/46; G01N 2291/0427
See application file for complete search history.

(56) References Cited

U.S. PATENT DOCUMENTS

| | | | | |
|---|---|---|---|---|
| 2003/0174387 A1* | 9/2003 | Eggleton | ............. | H01S 3/09415 359/334 |
| 2007/0167133 A1* | 7/2007 | Tomlinson, Jr. | ........ | G01N 29/07 455/39 |

(Continued)

FOREIGN PATENT DOCUMENTS

| | | |
|---|---|---|
| CN | 110108402 A | 8/2019 |
| CN | 113758617 A | 12/2021 |

OTHER PUBLICATIONS

HJ Lim and Hoon Sohn. Online stress monitoring technique based on lamb-wave measurements and convolutional neural network under static and dynamic loadings. Experimental Mechanics, 60(2):171-179, 2020. (Year: 2020).*

(Continued)

*Primary Examiner* — Natalie Huls
*Assistant Examiner* — Nyla Gavia
(74) *Attorney, Agent, or Firm* — IPRO, PLLC; Na Xu

(57) ABSTRACT

The present disclosure proposes a non-baseline on-line stress monitoring system and monitoring method based on multi-mode Lamb wave data fusion. A Lamb wave dispersion curve is established according to geometric dimensions and material parameters of a measured object, a cut-off frequency of a first-order Lamb wave mode is obtained, an excitation frequency of a Lamb wave signal is determined, and then pure Lamb waves in S0 and A0 modes obtained inside the measured object are obtained; an acoustoelastic equation is established, an elastodynamic equation of the measured object under a prestress condition is solved, and linear relationships between a group velocity and a stress of the Lamb waves in the S0 and A0 modes under the excitation frequency are obtained; data is processed through the on-line monitoring system; a stress gradient in a depth direction is calculated, and finally, a stress state of the measured object is represented. The present disclosure does not require data (Continued)

under a zero stress state as baseline data, does not require designing a wedge block capable of generating a critical refraction longitudinal wave, and combines acoustoelastic effects of Lamb waves in different modes to realize online stress monitoring without the baseline data.

6 Claims, 3 Drawing Sheets

(56) References Cited

U.S. PATENT DOCUMENTS

2016/0116822 A1* 4/2016 Kaneda ............... H01S 3/06754
372/6
2022/0049996 A1* 2/2022 Jiao ...................... G01N 29/341

OTHER PUBLICATIONS

Navneet Gandhi, Jennifer E Michaels, and Sang Jun Lee. Acoustoelastic lamb wave propagation in biaxially stressed plates. The Journal of the Acoustical Society of America, 132(3):1284-1293, 2012. (Year: 2012).*

Liu, Q., Cao, J., Hou, Z., Zhang, Y., Jing, X. (2021). Identification of Stiffness Force in Nonlinear Piezoelectric Structures Based on Hilbert Transform. In: Advances in Applied Nonlinear Dynamics, Vibration and Control—2021. ICANDVC 2021. Lecture Notes in Electrica (Year: 2021).*

* cited by examiner

NON-BASELINE ON-LINE STRESS MONITORING SYSTEM AND MONITORING METHOD BASED ON MULTI-MODE LAMB WAVE DATA FUSION

TECHNICAL FIELD

The disclosure herein relates to the field of structural health monitoring, is applied to the field of on-line stress monitoring of metallic materials and composite materials, and specifically relates to a non-baseline on-line stress monitoring system and monitoring method based on multi-mode Lamb wave data fusion.

BACKGROUND

In the fields of aeronautics and astronautics, construction, new energy and the like, mechanical structure components always work under a complex cyclic stress state, and a cyclic stress is generally less than the allowable stress of a mechanical structure, so that the structure will not be damaged immediately, but with cyclic loading of a stress, the strength, fatigue life and dimensional stability of the mechanical structure components will be greatly affected, in most cases, these stresses will reduce the strength of the component, and defects such as deformation and cracks are generated in use, which will shorten the fatigue life of the component, and may even cause significant safety accidents, thus monitoring a stress state of key components in real time and relieving stress timely can prolong the service life of an apparatus and improve the safety performance of the apparatus.

At present, there are many methods for stress measurement based on the relationship between physical properties and the stress, including an X-ray method, a neutron diffraction method, a magnetic Barkhausen method and an ultrasonic method. The ultrasonic method has been widely applied because of its simple measuring device, wide application range and the like.

In an existing method one, ultrasonic probes are arranged according to a one sending and multiple receiving mode. By measuring a change rate of propagation time between ultrasonic probe arrays, an average stress in an interval region of receiving probes is calculated as a discrete function, and then difference value processing is performed on the function so that the average stress in a distribution direction of the array can be obtained. This method using the array probe can effectively improve the spatial resolution of measurement compared with a traditional one sending and one receiving method, and can avoid rapid representation under complex stress conditions on the basis of rotating the probe in different directions. However, in this method, baseline data without a stress must be pre-calibrated and stored. In actual use, the baseline data changes greatly, which is not suitable for on-line monitoring of the stress state.

In an existing method two, by the advantages of laser ultrasound, such as long-distance monitoring, a wide frequency band, a multi-mode waveform and multiple shapes of an excitation source, ultrasonic surface waves are excited inside a metal additional material, and then acoustoelastic coefficients of the metal additional material in different directions are calibrated through a tensile test, and the residual stress gradient distribution inside the additional material is calculated by using a residual stress gradient model, so as to effectively solve the problem that the residual stress distribution inside metal additive manufacturing parts is complex and difficult to detect. Although this method can realize rapid and complete non-contact residual stress nondestructive detection of the measured parts, the ultrasonic wave excited by laser mainly depends on a thermoelastic effect or an ablation effect, which may cause certain damage to the surface of a measured object. Meanwhile, a laser ultrasonic method is not suitable for real-time monitoring of the stress state due to its complicated measurement apparatus and high measurement condition requirement.

In an existing method three, firstly an ultrasonic signal of a zero stress sample is acquired as a reference signal, then an actual detection signal is compared with the reference signal for analysis to obtain a maximum amplitude of noise, which is used as a threshold value, and finally interpolation processing is performed on the reference signal and a measurement signal to obtain intersection points between rising parts of the reference signal and the measurement signal and the threshold value, and difference value of the time of two intersection points is an acoustic time difference. This method has a better accuracy of acoustic time judgment under ideal conditions, but in the actual use process, because the environments in which the reference signal and the measurement signal are located are completely different, it is impossible to ensure accurate extraction of a noise signal amplitude, and it may even cause a large measurement error due to signal excursion, and thus the method which needs a baseline signal as the basis of stress measurement is not suitable for on-line monitoring of stress.

SUMMARY

In view of the defects of the existing methods, the present disclosure proposes a non-baseline on-line stress monitoring system and monitoring method based on multi-mode Lamb wave data fusion, orienting the urgent need of non-baseline stress on-line representation; according to linear relationships between a group velocity and a stress of S0 and A0 modes, an approximate linear relationship between a ratio of propagation time of waves in two modes and a stress at a fixed propagation distance is obtained, so that on-line monitoring of an absolute stress state of a measured structure can be realized without any reference baseline data.

The present disclosure is realized by means of the following solution:

a non-baseline on-line stress monitoring system based on multi-mode Lamb wave data fusion:

the on-line monitoring system specifically includes a waveform generator 1, a power amplifier 2, a piezoelectric wafer exciter 3, a piezoelectric wafer sensor 4, a high-bandwidth receiving and amplifying device 5, a high-speed data acquisition system 6 and a PC 7;

the waveform generator 1 generates a low-voltage modulation signal, and generates a Lamb wave for the piezoelectric wafer exciter 3 after amplification by the power amplifier 2, and Lamb waves in S0 and A0 modes propagate inside a measured object and are received by the piezoelectric wafer sensor 4;

the piezoelectric wafer sensor 4 inputs an obtained signal into the high-bandwidth receiving and amplifying device 5, and ensures that the signal is amplified into an input range of a digital-to-analog conversion chip through coarse gain tuning and fine gain tuning, and then a lower cut-off frequency and an upper cut-off frequency of a filter are set according to a bandwidth of an excitation signal, the amplified and filtered signal is input into the high-speed data acquisition system 6, the signal is encoded and processed by an FPGA chip, and a sampled signal is transmitted to the PC 7 by using a PXIE bus for storage.

A non-baseline on-line stress monitoring method based on multi-mode Lamb wave data fusion:

the method specifically includes the following steps:

step 1: establishing a Lamb wave dispersion curve according to geometric dimensions and material parameters of a measured object, obtaining a cut-off frequency of a first-order Lamb wave mode, determining an excitation frequency of a Lamb wave signal, and then obtaining pure Lamb waves in S0 and A0 modes obtained inside the measured object;

step 2: establishing an acoustoelastic equation, and after determining the excitation frequency of the Lamb wave signal, solving an elastodynamic equation of the measured object under a prestress condition, and obtaining linear relationships between a group velocity and a stress of the Lamb waves in the S0 and A0 modes under the excitation frequency;

in step two, the elastodynamic equation of the measured object under the prestress condition being:

$$A_{\alpha\beta\gamma\delta} \frac{\partial^2 u_\gamma}{\partial \xi_\delta \partial \xi_\beta} = \rho_0 \frac{\partial^2 u_\alpha}{\partial t^2} \tag{5}$$

where, $$A_{\alpha\beta\gamma\delta} = C_{\beta\delta\gamma\rho} e^i_{\lambda\rho} \delta_{\alpha\gamma} + C_{\alpha\beta\gamma\delta} + C_{\alpha\beta\rho\delta} \frac{\partial u^i_\gamma}{\partial \xi_\rho} + C_{\rho\beta\gamma\delta} \frac{\partial u^i_\alpha}{\partial \xi_\rho} + C_{\alpha\beta\gamma\delta\varepsilon\eta} e^i_{\varepsilon\eta} \tag{6}$$

in the equation, $C_{\alpha\beta\gamma\delta}$ represents a second-order elastic modulus of the measured object, $C_{\alpha\beta\gamma\delta\varepsilon\eta}$ represents a third-order elastic modulus of the measured object, $e^j_{\alpha\beta}$ represents an initial strain caused by a prestress, $u^i_\alpha$ represents an initial displacement caused by the prestress, and $\rho_0$ represents a density of the measured object;

a relationship between the group velocity and a frequency and a wave number of the Lamb wave satisfying:

$$c_g = \frac{d\omega}{dk} \tag{7}$$

where $c_g$ is the group velocity of the Lamb wave, $\omega$ is the frequency of the Lamb wave, and k is the wave number of the Lamb wave;

according to the group velocity of the Lamb waves in the S0 and A0 modes without a stress, linear relationships between a uniaxial prestress in a propagation direction and the group velocity of the Lamb waves in the S0 and A0 modes being established as:

$$c_{g(S_0)} = 5.5625 \times 10^{-7} \sigma + 5296.38 \tag{8}$$

$$c_{g(A_0)} = 1.675 \times 10^{-7} \sigma + 2891.56 \tag{9}$$

where $c_{g(S_0)}$ is the group velocity of the Lamb wave in the S0 mode, and $c_{g(A_0)}$ is the group velocity of the Lamb wave in the A0 mode;

according to equations (8) and (9), a relationship between a propagating sound-time ratio and a stress of the Lamb waves in the S0 and A0 modes at a fixed propagation distance being obtained as:

$$\frac{L/c_{g(A_0)}}{L/c_{g(s_0)}} = \tag{10}$$

$$\frac{c_{g(s_0)}}{c_{g(A_0)}} = \frac{5.5625 \times 10^{-7} \sigma + 5296.38}{1.675 \times 10^{-7} \sigma + 2891.56} \approx 8.6267 \times 10^{-11} \sigma + 1.8317$$

step 3: processing data by an on-line monitoring system, the on-line monitoring system being the above-mentioned on-line monitoring system; and step 4: calculating a stress gradient in a depth direction, performing Hilbert transformation on a signal received by a piezoelectric wafer sensor 4 to extract an amplitude envelope of the received signal, calculating the propagating sound-time ratio of the Lamb waves in the S0 and A0 modes, substituting the acoustoelastic equation established in step two to determine a magnitude and a direction of a uniaxial stress inside the measured object, and finally representing a stress state of the measured object.

Further, in step one, a calculation equation of the Lamb wave dispersion curve is a Rayleigh-Lamb wave dispersion equation:

$$\frac{\tan(qh)}{\tan(ph)} = -\frac{4k^2 pq}{(q^2 - k^2)^2} \tag{1}$$

$$\frac{\tan(qh)}{\tan(ph)} = -\frac{(q^2 - k^2)^2}{4k^2 pq} \tag{2}$$

where, p and q are respectively expressed as:

$$p = \sqrt{\frac{\omega^2}{c_L^2} - k^2} \tag{3}$$

$$q = \sqrt{\frac{\omega^2}{c_T^2} - k^2} \tag{4}$$

in the equations, $c_L$ and $c_T$ represent velocities of a longitudinal wave and a transverse wave, respectively; h represents half of a plate thickness; w is an angular frequency of an ultrasonic wave; k is the wave number;

equations (1) and (2) are solved to obtain a dispersion curve of a structure to be measured, and a cut-off frequency of a first-order Lamb wave mode is determined according to the dispersion curve of the structure to be measured, so that the excitation frequency of the Lamb signal is below the cut-off frequency of the first-order Lamb wave mode.

Further, in step four, a Hilbert transformation formula is:

$$\hat{f}(t) = H[f(t)] = \frac{1}{\pi} \int_{-\infty}^{\infty} \frac{f(t)}{t - \tau} \tag{11}$$

where f(t) is an original signal and $\tau$ is an integration variable.

Further, in step four,
a specific method for calculating the propagation sound-time ratio of the Lamb waves in the S0 and A0 modes is:
according to different propagation time of the S0 and A0 modes, wave packets of the S0 and A0 modes are distinguished, arrival time of the two wave packets is determined by a peak extraction algorithm, and propagation time of the Lamb waves in the two modes at the fixed distance is determined according to a width of the excitation signal, and a ratio of the propagation time of the two is calculated.

An electronic device, includes a memory and a processor. The memory stores a computer program. The processor executes the computer program to implement the steps of the above method.

Further provided is a computer-readable storage medium, configured to store the computer instructions, where the steps of the above method are implemented when the computer instructions are executed by the processor.

The beneficial effects of the present disclosure.

(1) The present disclosure innovatively uses multi-mode characteristics of the Lamb waves to realize data fusion on the basis of a Lamb wave acoustoelastic effect. According to the geometric dimensions of the structure to be measured, an appropriate excitation frequency is selected, and the Lamb waves in the S0 and A0 modes are excited inside the structure to be measured. Because acoustoelastic coefficients of the Lamb waves in the S0 and A0 modes are different, the acoustic-time changes of the two modes caused by the stress are completely different at the same propagation distance. However, the relationships between the stress and the group velocity of the two modes are all the linear relationships. Therefore, it can be determined that there is still linear relationship between the propagation acoustic-time ratios of the S0 mode and the A0 mode at the fixed propagation distance and the stress.

(2) The absolute stress state of the measured object can be represented by the linear relationship, and the data under a zero stress state is not required as the baseline data; unlike a conventional LCR wave stress measurement method which requires accurately designing wedge blocks capable of generating critical refraction longitudinal waves, in the method of the present disclosure, the Lamb wave can be excited and received just by bonding a common disc-shaped piezoelectric wafer sensor on the structure to be measured, and the present disclosure combines the acoustoelastic effects of the Lamb waves in different modes to realize on-line stress monitoring without the baseline data.

DETAILED DESCRIPTION

The technical solutions in the examples of the disclosure will be clearly and completely described below with reference to the drawings in the examples of the disclosure. It is apparent that the described examples are only a part of the examples of the disclosure, but are not all of the examples; based on the examples in the disclosure, all other examples obtained by those skilled in the art without creative efforts fall within the scope of protection of the disclosure.

Figure 1:
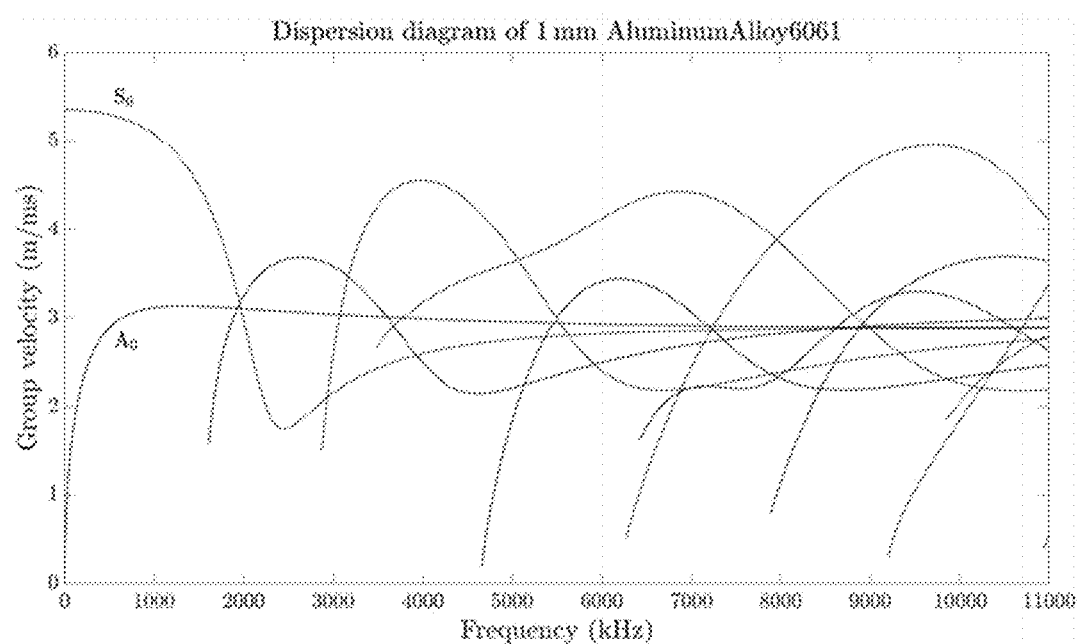
FIG. 1 is a group velocity dispersion curve of a mm 6061 aluminum plate of the present disclosure.
Figure 2:
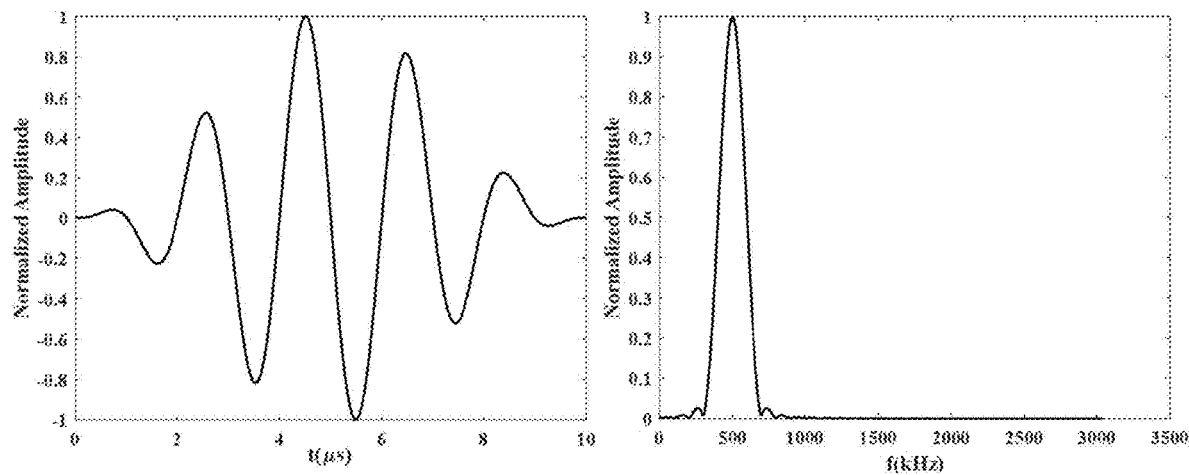
FIG. 2 is time domain curve and frequency diagrams of an excitation signal of the present disclosure, where (a) is a time domain curve diagram and (b) is a frequency diagram.
Figure 3:
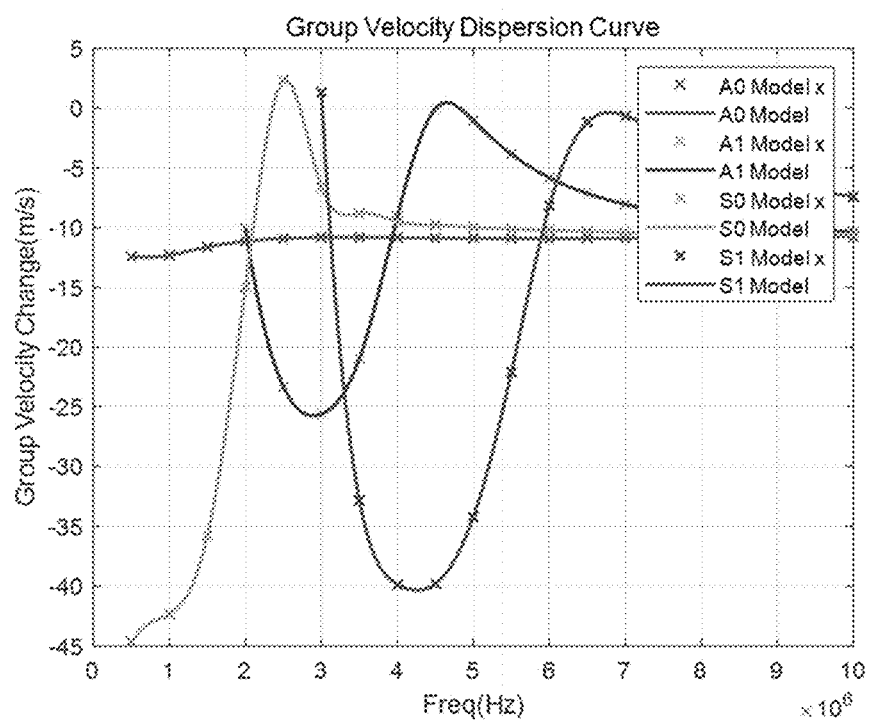
FIG. 3 is group velocity changes of Lamb waves in different modes under an uniaxial stress of 100 MPa of the present disclosure.
Figure 4:
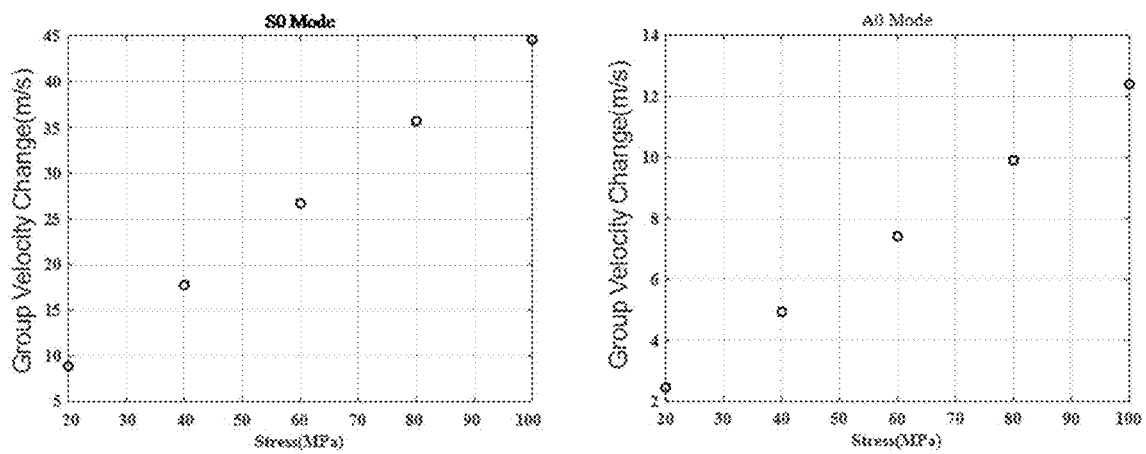
FIG. 4 is group velocity changes in S0 and A0 modes caused by a stress of 500 kHz of the present disclosure, where a left panel of FIG. 4 is the group velocity change in the S0 mode and a right panel of FIG. 4 is the group velocity change in the A0 mode.
Figure 5:
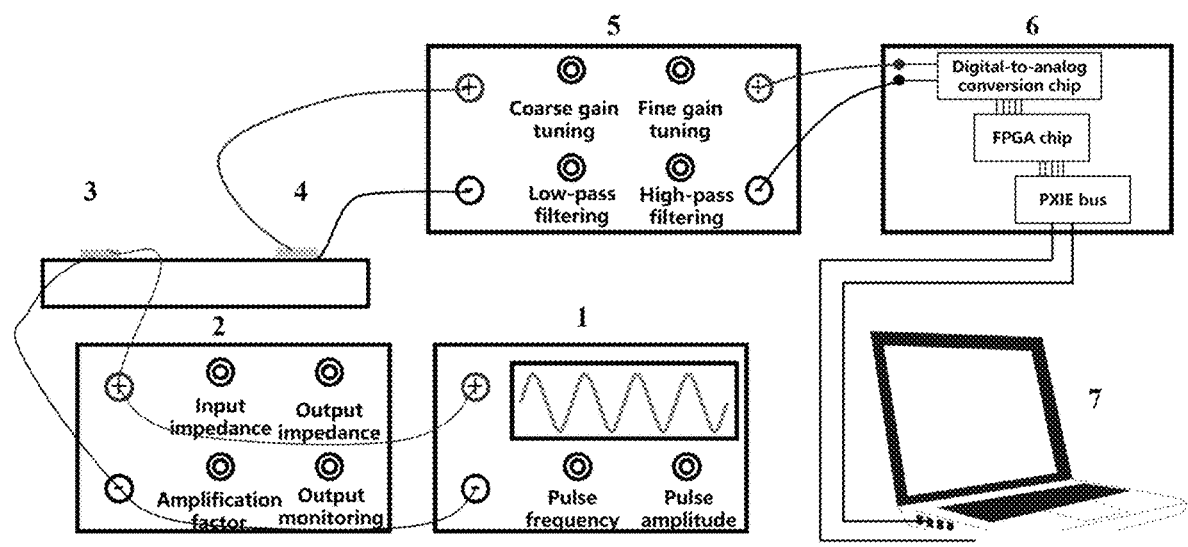
FIG. 5 is an integrated measurement system of the present disclosure, where 1 is a waveform generator, 2 is a power amplifier, 3 is a piezoelectric wafer exciter, 4 is a piezoelectric wafer sensor, 5 is a high-bandwidth receiving and amplifying device, 6 is a high speed data acquisition system, and 7 is a PC.

With reference to FIG. 1 to FIG. 5,
at a normal temperature, a measured object is a 6061 aluminum plate with a thickness of 1 mm, which is an isotropic material. An arbitrary waveform generator is used to generate a 500 kHz pulse waveform modulated by a Hanning window. A low-frequency signal generated by a signal generator is first-stage amplified by an Aigtek power amplifier. A high-voltage signal is used to excite a piezoelectric wafer exciter and generate a trigger signal at the same time. A high-speed data acquisition board is used to acquire an ultrasonic signal obtained by a piezoelectric wafer sensor. Before acquiring a received signal, the signal is firstly weakly amplified and band-pass filtered to amplify the signal to an input voltage range of a data acquisition board. The received signal is continuously acquired for 10 times, and the acquired signal is smoothly filtered to filter a part of electronic noise, so as to improve a signal-to-noise ratio of the received signal. Then propagation time of Lamb waves in S0 and A0 modes is determined by Hilbert transformation and a peak extraction algorithm, a ratio of the propagation time is substituted into a pre-calibrated acoustoelastic equation, and an obtained result is an uniaxial stress value of the measured object.

A non-baseline on-line stress monitoring system based on multi-mode Lamb wave data fusion:

the on-line monitoring system specifically includes a waveform generator 1, a power amplifier 2, a piezoelectric wafer exciter 3, a piezoelectric wafer sensor 4, a high-bandwidth receiving and amplifying device 5, a high-speed data acquisition system 6 and a PC 7;

the waveform generator 1 generates a low-voltage modulation signal, and generates a Lamb wave for the piezoelectric wafer exciter 3 after amplification by the power amplifier 2, and Lamb waves in S0 and A0 modes propagate inside the measured object and are received by the piezoelectric wafer sensor 4; the received signal is a weak signal of an order of mV, which is easily interfered by random electronic noise, so it is necessary to perform non-distortion amplification on an original signal, and then perform bandwidth filtering on the amplified signal;

the piezoelectric wafer sensor 4 inputs an obtained signal into the high-bandwidth receiving and amplifying device 5, and ensures that the signal is amplified into an input range of a digital-to-analog conversion chip through coarse gain tuning and fine gain tuning, and then a lower cut-off frequency and an upper cut-off frequency of a filter are set according to a bandwidth of an excitation signal, the amplified and filtered signal is input into the high-speed data acquisition system 6, the signal is encoded and processed by an FPGA chip, and a sampled signal is transmitted to the PC 7 by using a PXIE bus for storage.

A non-baseline on-line stress monitoring method based on multi-mode Lamb wave data fusion:

the method specifically includes the following steps:

step 1: establishing a Lamb wave dispersion curve according to geometric dimensions and material parameters of a measured object, obtaining a cut-off frequency of a first-order Lamb wave mode, determining an excitation frequency of a Lamb wave signal, and then obtaining pure Lamb waves in S0 and A0 modes obtained inside the measured object;

step 2: establishing an acoustoelastic equation, and after determining the excitation frequency of the Lamb wave signal, solving an elastodynamic equation of the measured object under a prestress condition, and obtaining linear relationships between a group velocity and a stress of the Lamb waves in the S0 and A0 modes under the excitation frequency;

further determining linear relationships between a propagating sound-time ratio and the stress in two modes at a fixed propagation distance;

step 3: processing data by an on-line monitoring system, the on-line monitoring system being the above-mentioned on-line monitoring system; and according to the selected excitation frequency, the excitation signal modulated by the Hanning window being loaded inside a signal generator, and driving a transmitting probe after passing through a power amplifier, a signal of a receiving probe at the other end being received by a high-speed acquisition board card after being subjected to first-stage weak signal amplification, and being transmitted to an upper computer through a PXIE bus, and data processing being performed after the signal is stored;

step 4: calculating a stress gradient in a depth direction, performing Hilbert transformation on a signal received by a piezoelectric wafer sensor 4 to extract an amplitude envelope of the received signal, calculating the propagating sound-time ratio of the Lamb waves in the S0 and A0 modes, substituting the acoustoelastic equation established in step two to determine a magnitude and a direction of a uniaxial stress inside the measured object, and finally representing a stress state of the measured object.

In step one, a calculation equation of the Lamb wave dispersion curve is a Rayleigh-Lamb wave dispersion equation:

$$\frac{\tan(qh)}{\tan(ph)} = -\frac{4k^2 pq}{(q^2-k^2)^2} \quad (1)$$

$$\frac{\tan(qh)}{\tan(ph)} = -\frac{(q^2-k^2)^2}{4k^2 pq} \quad (2)$$

where, p and q are respectively expressed as:

$$p = \sqrt{\frac{\omega^2}{c_L^2} - k^2} \quad (3)$$

$$q = \sqrt{\frac{\omega^2}{c_T^2} - k^2} \quad (4)$$

in the equations, $c_L$ and $C_T$ represent velocities of a longitudinal wave and a transverse wave, respectively; h represents half of a plate thickness; w is an angular frequency of an ultrasonic wave; k is the wave number; equations (1) and (2) are solved to obtain a dispersion curve of a structure to be measured, and a cut-off frequency of a first-order Lamb wave mode is determined according to the dispersion curve of the structure to be measured, so that the excitation frequency of the Lamb signal is below the cut-off frequency of the first-order Lamb wave mode.

In this example, it is assumed that the object to be measured is an aluminium plate with a thickness of 1 mm and a trade mark of 6061, according to the dispersion curve, it can be determined that the cut-off frequency of the first-order Lamb wave mode is 1.6 MHz, and therefore, a modulation signal with a frequency of 500 kHz is selected to excite the Lamb wave.

In step two, the elastodynamic equation of the measured object under the prestress condition being:

$$A_{\alpha\beta\gamma\delta}\frac{\partial^2 u_\gamma}{\partial \xi_\delta \partial \xi_\beta} = \rho_0 \frac{\partial^2 u_\alpha}{\partial t^2} \quad (5)$$

where, $$A_{\alpha\beta\gamma\delta} = \quad (6)$$
$$C_{\beta\delta\gamma\rho}e^i_{\lambda\rho}\delta_{\alpha\gamma} + C_{\alpha\beta\gamma\delta} + C_{\alpha\beta\rho\delta}\frac{\partial u^i_\gamma}{\partial \xi_\rho} + C_{\rho\beta\gamma\delta}\frac{\partial u^i_\alpha}{\partial \xi_\rho} + C_{\alpha\beta\gamma\delta\epsilon\eta}e^i_{\epsilon\eta}$$

in this example, $C_{\alpha\beta\gamma\delta}$ represents a second-order elastic modulus of 6061 aluminum, $C_{\alpha\beta\gamma\delta\epsilon\eta}$ represents a third-order elastic modulus of the 6061 aluminum, $e^i_{\alpha\beta}$ represents an initial strain caused by a prestress, $u^i_\alpha$ represents an initial displacement caused by the prestress, and $\rho_0$ represents a density of the 6061 aluminum.

In order to establish the dispersion curve of the measured object, the elastodynamic equation of equation (5) is solved by a semi-analytical finite element method, it is assumed that a displacement of the Lamb wave in the propagation direction is represented in a vibration mode of a simple harmonic wave, it is only necessary to discretize a finite element on a cross section of a waveguide, and then a characteristic equation is solved in a target frequency range to obtain wave numbers at different frequencies. Finally, the dispersion curve of the Lamb wave can be drawn completely, and the relationship between the group velocity wave and the frequency and the wave number of the Lamb wave satisfies:

$$c_g = \frac{d\omega}{dk} \quad (7)$$

where $c_g$ is the group velocity of the Lamb wave, ω is the frequency of the Lamb wave, and k is the wave number of the Lamb wave;

a uniaxial prestress is applied to the measured object in the propagation direction of the Lamb wave, the prestress is 100 MPa, and group velocity changes of Lamb waves in different modes at different frequencies are obtained. The effects of the same stress on the group velocity of the Lamb waves in different modes are different, and effect results of the same stress on the Lamb wave in the same mode at different frequencies are also different, which shows that the effect of the stress on the Lamb waves is complex due to the dispersion characteristics of the Lamb waves.

In this example, the effects of the stress on the Lamb waves in different modes at the same frequency are considered, it is set that the prestress of the measured object starts from 20 MPa, and linearly increases to 100 MPa, taking 20 MPa as stepping, and the relationships between the stress and the group velocity change at 500 kHz in S0 and A0 modes are respectively obtained, according to the group velocity of the Lamb waves in the S0 and A0 modes without a stress, linear relationships between a uniaxial prestress in a propagation direction and the group velocity of the Lamb waves in the S0 and A0 modes being established as:

$$c_{g(S_0)} = 5.5625 \times 10^{-7} \sigma + 5296.38 \quad (8)$$

$$c_{g(A_0)} = 1.675 \times 10^{-7} \sigma + 2891.56 \quad (9)$$

where $c_{g(S_0)}$ is the group velocity of the Lamb wave in the S0 mode, and $c_{g(A_0)}$ is the group velocity of the Lamb wave in the A0 mode;

according to equations (8) and (9), a relationship between a propagating sound-time ratio and a stress of the Lamb waves in the S0 and A0 modes at a fixed propagation distance being obtained as:

$$\frac{L/c_{g(A_0)}}{L/c_{g(s_0)}} = \frac{c_{g(s_0)}}{c_{g(A_0)}} = \frac{5.5625 \times 10^{-7} \sigma + 5296.38}{1.675 \times 10^{-7} \sigma + 2891.56} \approx 8.6267 \times 10^{-11} \sigma + 1.8317. \quad (10)$$

It can be determined from equation (10) that at the fixed propagation distance, the ratio of the propagating acoustic time in the A0 and S0 modes has an approximate linear relationship with the stress, and thus by using the data fusion of the S0 and A0 modes, average stress measurement on a propagation path of the Lamb wave can be achieved without the baseline data.

In step four,
a Hilbert transformation formula is:

$$\hat{f}(t) = H[f(t)] = \frac{1}{\pi} \int_{-\infty}^{\infty} \frac{f(t)}{t - \tau} \quad (11)$$

where f(t) is an original signal and τ is an integration variable.

In step four,
a specific method for calculating the propagation sound-time ratio of the Lamb waves in the S0 and A0 modes is:
according to different propagation time of the S0 and A0 modes, wave packets of the S0 and A0 modes are distinguished, arrival time of the two wave packets is determined by a peak extraction algorithm, and propagation time of the Lamb waves in the two modes at the fixed distance is determined according to a width of the excitation signal, and a ratio of the propagation time of the two is calculated.

An electronic device, includes a memory and a processor, the memory storing a computer program, where the processor implements the steps of the above method when executing the computer program.

A computer-readable storage medium, configured to store the computer instructions, where the steps of the above method are implemented when the computer instructions are executed by the processor.

The non-baseline on-line stress monitoring method based on multi-mode Lamb wave data fusion provided by the present disclosure is described in detail as above. The principles and implementation methods of the present disclosure are described. The description of the above examples is only used to help understand the method and core idea of the present disclosure. Meanwhile, for those skilled in the art, according to the idea of the present disclosure, there will be changes in the specific implementation mode and application scope of the disclosure. Based on the above, the content of the description shall not be construed as limiting the present disclosure.

What is claimed is:

1. A method of non-baseline on-line stress monitoring based on multi-mode Lamb wave data fusion, wherein the method comprises the following steps:
   step 1: establishing a Lamb wave dispersion curve according to geometric dimensions and material parameters of a measured object, obtaining a cut-off frequency of a first-order Lamb wave mode, determining an excitation frequency of a Lamb wave signal, and then obtaining pure Lamb waves in S0 and A0 modes obtained inside the measured object;
   step 2: after determining the excitation frequency of the Lamb wave signal, solving an elastodynamic equation of the measured object under a prestress condition;
   the elastodynamic equation of the measured object under the prestress condition being:

$$A_{\alpha\beta\gamma\delta} \frac{\partial^2 u_\gamma}{\partial \xi_\delta \partial \xi_\beta} = \rho_0 \frac{\partial^2 u_\alpha}{\partial t^2} \quad (5)$$

wherein, $$A_{\alpha\beta\gamma\delta} = \quad (6)$$
$$C_{\beta\delta\gamma\rho} e^i_{\lambda\rho} \delta_{\alpha\gamma} + C_{\alpha\beta\gamma\delta} + C_{\alpha\beta\rho\delta} \frac{\partial u^i_\gamma}{\partial \xi_\rho} + C_{\rho\beta\gamma\delta} \frac{\partial u^i_\alpha}{\partial \xi_\rho} + C_{\alpha\beta\gamma\delta\epsilon\eta} e^i_{\epsilon\eta}$$

in the equation, $C_{\alpha\beta\gamma\delta}$ represents a second-order elastic modulus of the measured object, $C_{\alpha\beta\gamma\delta\epsilon\eta}$ represents a third-order elastic modulus of the measured object, $e^i_{\alpha\beta}$ represents an initial strain caused by a prestress, $u^i_\alpha$ represents an initial displacement caused by the prestress, and $\rho_0$ represents a density of the measured object;

a relationship between a group velocity and a frequency and a wave number of the Lamb wave satisfying:

$$c_g = \frac{d\omega}{dk} \quad (7)$$

wherein $c_g$ is the group velocity of the Lamb wave, ω is the frequency of the Lamb wave, and k is the wave number of the Lamb wave;

step 3: obtaining a first relationship between a group velocity change of the Lamb wave in S0 mode and a stress of the measured object, and a second relationship between the group velocity change of the Lamb wave in A0 mode and a stress of the measured object;

Step 4: according to the group velocity of the Lamb waves in the S0 mode without a stress, the group velocity of the Lamb waves in the A0 mode without a stress, the first relationship and the second relationship, obtaining a first linear relationship between the group velocity of the Lamb waves in the S0 mode and a uniaxial prestress in a propagation direction under the excitation frequency, and a second linear relationship between the group velocity of the Lamb waves in the A0 mode and a uniaxial prestress in a propagation direction under the excitation frequency:

$$c_{g(S_0)} = 5.5625 \times 10^{-7} \sigma + 5296.38 \quad (8)$$

$$c_{g(A_0)} = 1.675 \times 10^{-7} \sigma + 2891.56 \quad (9)$$

wherein $c_{g(S_0)}$ is the group velocity of the Lamb wave in the S0 mode, and $c_{g(A_0)}$ is the group velocity of the Lamb wave in the A0 mode, σ is the uniaxial prestress in a propagation direction;

step 5: according to the first linear relationship and the second linear relationship, obtaining an approximately linear relationship between a propagating sound-time ratio of the Lamb waves in the S0 and A0 modes at a fixed propagation distance L and a stress:

$$\frac{L/c_{g(A_0)}}{L/c_{g(S_0)}} = \frac{c_{g(S_0)}}{c_{g(A_0)}} = \frac{5.5625 \times 10^{-7} \sigma + 5296.38}{1.675 \times 10^{-7} \sigma + 2891.56} \approx 8.6267 \times 10^{-11} \sigma + 1.8317 \quad (10)$$

wherein, the propagating sound-time ratio of the Lamb waves in the S0 and A0 modes is a ratio of a propagating sound-time of the Lamb waves in the A0 mode at a fixed propagation distance L to a propagating sound-time of the Lamb waves in the S0 mode at a fixed propagation distance L;

step 6: processing data by an on-line monitoring system; and step 7: calculating a stress gradient in a depth direction, performing Hilbert transformation on a signal received by a piezoelectric wafer sensor (4) to extract an amplitude envelope of the received signal, calculating the propagating sound-time ratio of the Lamb waves in the S0 and A0 modes, substituting the propagating sound-time ratio into the approximately linear relationship established in step 5 to determine a magnitude and a direction of a uniaxial stress inside the measured object, and finally representing a stress state of the measured object;

wherein the on-line monitoring system comprises a waveform generator (1), a power amplifier (2), a piezoelectric wafer exciter (3), a piezoelectric wafer sensor (4), a high-bandwidth receiving and amplifying device (5), a high-speed data acquisition system (6) and a PC (7);

the waveform generator (1) generates a low-voltage modulation signal, and generates a Lamb wave for the piezoelectric wafer exciter (3) after amplification by the power amplifier (2), and Lamb waves in S0 and A0 modes propagate inside a measured object and are received by the piezoelectric wafer sensor (4);

the piezoelectric wafer sensor (4) inputs an obtained signal into the high-bandwidth receiving and amplifying device (5), and ensures that the signal is amplified into an input range of a digital-to-analog conversion chip through coarse gain tuning and fine gain tuning, and then a lower cut-off frequency and an upper cut-off frequency of a filter are set according to a bandwidth of an excitation signal, the amplified and filtered signal is input into the high-speed data acquisition system (6), the signal is encoded and processed by an FPGA chip, and a sampled signal is transmitted to the PC (7) by using a PXIE bus for storage.

2. The method according to claim 1, wherein in step 1, a calculation equation of the Lamb wave dispersion curve is a Rayleigh-Lamb wave dispersion equation:

$$\frac{\tan(qh)}{\tan(ph)} = -\frac{4k^2 pq}{(q^2 - k^2)^2} \quad (1)$$

$$\frac{\tan(qh)}{\tan(ph)} = -\frac{(q^2 - k^2)^2}{4k^2 pq} \quad (2)$$

wherein, p and q are respectively expressed as:

$$p = \sqrt{\frac{\omega^2}{c_L^2} - k^2} \quad (3)$$

$$q = \sqrt{\frac{\omega^2}{c_T^2} - k^2} \quad (4)$$

in the equations, $c_L$ and $C_T$ represent velocities of a longitudinal wave and a transverse wave, respectively; h represents half of a plate thickness; w is an angular frequency of an ultrasonic wave; k is the wave number;

equations (1) and (2) are solved to obtain a dispersion curve of a structure to be measured, and a cut-off frequency of a first-order Lamb wave mode is determined according to the dispersion curve of the structure to be measured, so that the excitation frequency of the Lamb signal is below the cut-off frequency of the first-order Lamb wave mode.

3. The method according to claim 2, wherein in step 4, a Hilbert transformation formula is:

$$\hat{f}(t) = H[f(t)] = \frac{1}{\pi} \int_{-\infty}^{\infty} \frac{f(t)}{t - \tau} \quad (11)$$

wherein f(t) is an original signal and τ is an integration variable.

4. The method according to claim 3, wherein in step 4, a specific method for calculating the propagation sound-time ratio of the Lamb waves in the S0 and A0 modes is:

according to different propagation time of the S0 and A0 modes, wave packets of the S0 and A0 modes are distinguished, arrival time of the two wave packets is determined by a peak extraction algorithm, and propagation time of the Lamb waves in the two modes at the fixed distance is determined according to a width of the excitation signal, and a ratio of the propagation time of the two is calculated.

5. An electronic device, comprising a memory and a processor, the memory storing a computer program, wherein the processor implements the steps of the methods according to claim 1 when executing the computer program.

6. A non-transitory computer-readable storage medium, configured to store a computer instruction, wherein the steps of the methods according to claim 1 are implemented when the computer instruction is executed by a processor.

* * * * *